J. E. Boyle,
Water-Closet Valve.

Nº 26,645.  Patented Jan. 3, 1860.

Witnesses:  Inventor:

UNITED STATES PATENT OFFICE.

JAMES E. BOYLE, OF BROOKLYN, NEW YORK.

VALVE FOR WATER-CLOSETS.

Specification forming part of Letters Patent No. 26,645, dated January 3, 1860; Reissued January 6, 1863, No. 1,375.

*To all whom it may concern:*

Be it known that I, JAMES E. BOYLE, of Brooklyn, in the county of Kings, New York, have invented certain new and useful Improvements in Valve or Supply Cocks for Water-Closets and other Like Purposes; and I do hereby declare that the following is a full, clear, and exact description thereof, reference being had to the accompanying drawings, making part of this specification, in which—

Figure 4:
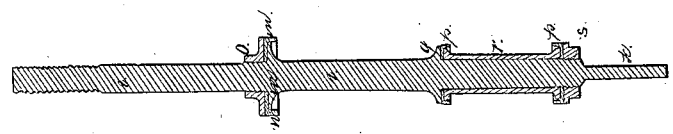
Figure 3:
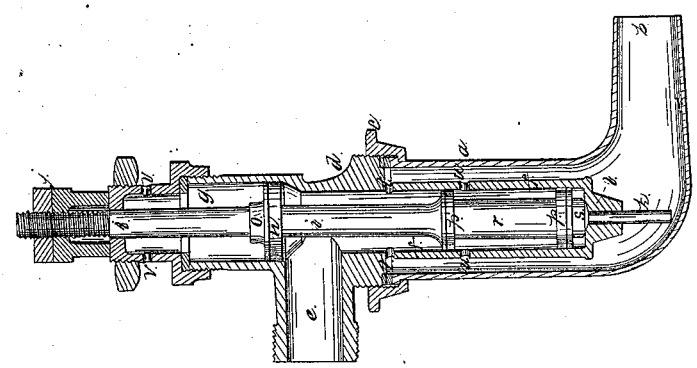
Figure 1:
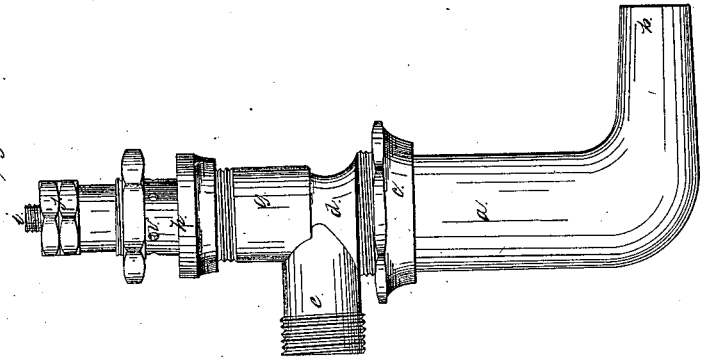
Figure 2:
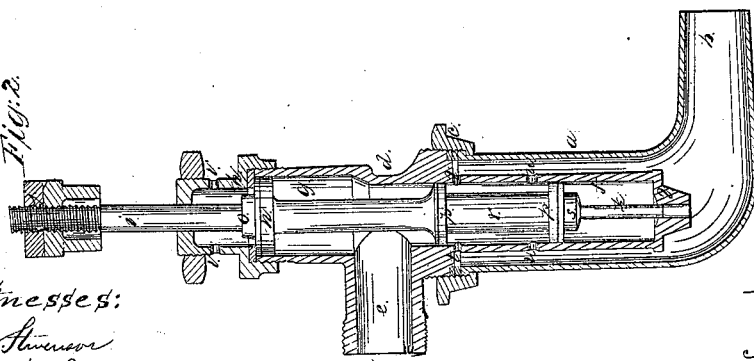

Figure 1, is an external view of the pipe containing the valves; Fig. 2, a vertical section with the water ways closed; Fig. 3, a like section with the water ways open; and Fig. 4, a section of the valve stem and valves.

The same letters indicate like parts in all the figures.

In my said invention after the valve stem has been depressed to open the water ways, for the passage of a supply of water, and the stem is liberated the pressure of the water acts as a motor to operate the valves in the opposite direction by a slow motion to shut the water ways slowly that the water may continue to flow for any desired period of time after the stem is liberated.

My said invention is well adapted to supply water to water closets and other pans for by connecting the valve stem with a hinged seat the depression of the seat will force down the valve stem and open the water ways for the flow of water, and on rising from the seat the water will act as a motor to close the water ways slowly, and thus afford an afterflow of water to wash out the pan; and as the apparatus is self-acting, there is always a certainty that the water will be shut off.

In the accompanying drawings (*a*) represents the induction pipe which is to be connected at (*b*) with any supply pipe leading from a head of water. The upper end of this pipe (*a*) is provided with packing and a coupling nut (*c*) by which it is coupled with the body of the cock (*d*) but it may be coupled or connected in any other suitable manner. The body of the cock is provided with a branch or eduction pipe (*e*) leading to the pan of a water closet or to any other pan with which it may be desired to form the connection. The bore of the body of the cock from the eduction pipe (*e*) is cylindrical, and from the point of coupling this cylindrical bore extends some distance down into the induction pipe, as represented at (*f*) the external diameter of the said extended part (*f*) being sufficiently less than the inner diameter of the induction pipe to leave a free passage for water all around. The bore of the body (*d*) above the eduction pipe (*e*) is of greater diameter as represented at (*g*) and the upper end is covered with a screw cap (*h*) properly packed.

The valve stem (*i*) is placed centrally in the body of the cock with its upper and cylindrical end accurately fitted to slide in a central hole in the cap (*h*). Its extreme upper end if desired may be threaded and provided with adjusting nuts (*j*) by means of which its range of downward motion can be readily regulated. The lower end (*k*) of this valve stem (*i*) is of smaller diameter and fitted to slide loosely in a hole made in the center of the bottom (*l*) of the extension (*f*) of the cock, and so loosely that water may flow through slowly, or instead a small hole may be made through this bottom. This stem (*i*) is flanched at (*m*) to receive a cup leather (*n*) which is there secured by a cap nut (*o*). This cup leather is made to fit the large bore (*g*) of the body of the cock. Below this there are two other cup leathers (*p*, *p*) fitted to the smaller bore in the body and extension (*f*), the upper one of these leathers being put against the under face of a flanch (*q*) and there held by a thimble (*r*) the ends of which are flanched, and the lower one of these leathers is put under the lower flanch of the thimble and there secured by a nut (*s*).

Through the extension (*f*) of the body of the cock there are two sets of holes (*t*) and (*u*) for the passage of water from the induction pipe (*a*) to the inside of the cock. And the distance between the two cup leathers (*p*, *p*,) on the stem and the two sets of holes (*t*) and (*u*) and the relative positions of these must be such that when the valve stem is lifted up the upper cup leather, or piston (for as such it acts) shall be above the upper set of holes (*t*) and when the stem is depressed it shall be below the said holes, but never descend to the lower set of holes (*u*) and the lower cup leather or piston (*p*) must always be below the lower set of holes ($u$). The cap ($h$) which covers the enlarged part or chamber ($g$) is provided with holes ($v$).

The moment the valve stem is depressed to the position represented in Fig. 3, the upper piston ($p$) is below the holes ($t$) and then the water will flow freely from the induction pipe ($a$) through the holes ($t$) through the cock and out through the eduction pipe ($e$). At the same time the water has free access through the holes ($u$) to the inside of the extension ($f$) and between the cup leathers ($p, p,$) the pressure of the water therein packing the said leathers against the bore of the cylinder that they may act as pistons. So soon as the stem is liberated the pressure of the water on the two pistons ($p, p$) being balanced and the water having access to the inside of the extension ($f$) through the hole in the bottom, or around the stem ($k$), acts against the under face of the lower piston ($p$) and forces up the stem slowly, until the upper piston ($p$) passes above the holes ($t$) which shuts off the further passage of water; and as the hole in the bottom or around the stem ($k$) is very small the closing motion will be slow so that there may be a flow of water through the cock to the pan after the valve stem is liberated.

Water is prevented from escaping from the upper end through the hole in the cap ($h$) by the cup leather ($n$), which acts as a packing, but as this would act as a piston in depressing the valve stem and thereby produce a vacuum above which would seriously resist the downward motion of the stem the cap is provided with holes ($v$) for the passage of air.

I am aware that hydrants have heretofore been constructed with two piston valves upon one stem fitted to cylinders of unequal diameters one above the other, and the smaller of the two cylinders surrounded by an induction-pipe of greater diameter forming a surrounding induction chamber, with passages from the said surrounding induction chamber to the inside of the smaller cylinder, and the larger cylinder provided with a discharge pipe for the delivery of water, so that when the two pistons are elevated the smaller piston is above the passages, which admit the water, but when depressed, the induction water shall enter from the induction pipe into the smaller cylinder above the smaller piston, and thence pass up through the smaller cylinder into the larger cylinder and thence out at the discharge pipe, the pressure of the water so introduced acting upward against the larger piston and downward against the smaller piston and, when the piston rod is liberated by preponderance, against the larger piston, gradually forcing up both pistons, which are on the same rod, until the smaller piston is carried up above the induction pipes by a gradual motion, thus shutting off the further supply, until the two pistons are again depressed, but this is only applicable to hydrants where the nozzle of the discharge pipe can be carried up a considerable distance above the larger piston, for, in this way alone can the water act upward against the under face of the larger piston to gradually shut off the further supply. And I am also aware that attempts have been made to remedy this defect by connecting the two unequal pistons by means of a hollow piston rod provided with a discharge nozzle, and with apertures along that portion of its length, which lies between the two pistons so that on the depression of the pipe rod with its two pistons water shall enter from the supply pipe into the cylinder surrounding the two pistons and thence through the apertures into the pipe rod or hollow piston rod and through its length out at the nozzle; but this too is defective for the reason that the discharge nozzle is required to move up and down with the pistons in consequence of which it is not applicable to many purposes and localities requiring a permanent discharge pipe such as supplying water to water closets and other pans. By my improvement I attain the advantages of both of these methods while at the same time I avoid the defects above pointed out.

What I claim as my invention and desire to secure by Letters Patent is—

Combining with the body of the cock provided with the discharge pipe or nozzle and having its cylindrical bore surrounded by an induction pipe forming a surrounding chamber with apertures in its bore for the admission of water, as herein described, three piston valves on a movable stem, one above the discharge pipe, and the other two below it, and bearing the relations to the series of apertures from the cylindrical bore in which they work to the surrounding supply chamber, substantially such as described.

J. E. BOYLE.

Witnesses:
  GEO. STEVENSON,
  C. A. SEWARD.